(12) United States Patent
Nevin

(10) Patent No.: US 10,337,936 B2
(45) Date of Patent: Jul. 2, 2019

(54) DYNAMOMETER HAVING A CHASSIS TO CHASSIS LOAD MEASUREMENT DEVICE

(71) Applicant: Techlusion Corporation, Belgrade, MT (US)

(72) Inventor: Kyndra A. Nevin, Bozeman, MI (US)

(73) Assignee: Techlusion Corporation, Belgrade, MT (US)

( * ) Notice: Subject to any disclaimer, the term of this patent is extended or adjusted under 35 U.S.C. 154(b) by 282 days.

(21) Appl. No.: 15/357,443

(22) Filed: Nov. 21, 2016

(65) Prior Publication Data

US 2017/0146431 A1    May 25, 2017

Related U.S. Application Data

(60) Provisional application No. 62/383,835, filed on Sep. 6, 2016, provisional application No. 62/257,524, filed on Nov. 19, 2015.

(51) Int. Cl.
*G01L 3/24* (2006.01)
*G01M 17/007* (2006.01)

(52) U.S. Cl.
CPC .............. *G01L 3/24* (2013.01); *G01M 17/007* (2013.01); *G01M 17/0074* (2013.01); *G01M 17/0076* (2013.01)

(58) Field of Classification Search
CPC .. G01L 3/24; G01M 17/0076; G01M 17/0074
USPC .......................................... 73/116.09, 116.06
See application file for complete search history.

(56) References Cited

U.S. PATENT DOCUMENTS

| 4,925,183 | A | * | 5/1990 | Kim | ........................ | A63B 22/16 434/61 |
| 5,076,792 | A | * | 12/1991 | Niermann | ............... | A63B 22/16 434/61 |
| 7,270,545 | B2 | * | 9/2007 | Milner | .................... | G09B 9/058 434/61 |
| 8,418,541 | B2 | | 4/2013 | Kirkpatrick | | |
| 2009/0133484 | A1 | * | 5/2009 | Inoue | ................. | G01M 17/0074 73/117.01 |
| 2010/0251832 | A1 | * | 10/2010 | Kirkpatrick | ............... | G01L 3/22 73/862.191 |
| 2016/0313214 | A1 | * | 10/2016 | Takahashi | ......... | G01M 17/0074 |

* cited by examiner

*Primary Examiner* — Eric S. McCall
*Assistant Examiner* — Timothy P Graves
(74) *Attorney, Agent, or Firm* — MacMillan, Sobanski & Todd, LLC

(57) ABSTRACT

A dynamometer includes a dynamometer chassis configured to support a vehicle thereon. A roller load test unit is mounted in a load supporting surface of the dynamometer chassis, and a chassis to chassis load measurement device is attached between the dynamometer chassis and a chassis of the vehicle positioned on the dynamometer chassis. A load sensing mechanism is attached within the chassis to chassis load measurement device between the dynamometer chassis and the chassis of the vehicle supported on the dynamometer chassis such that a longitudinal axis of the vehicle extends therethrough, and the load sensing mechanism is configured to measure force in the longitudinal direction of the vehicle.

6 Claims, 6 Drawing Sheets

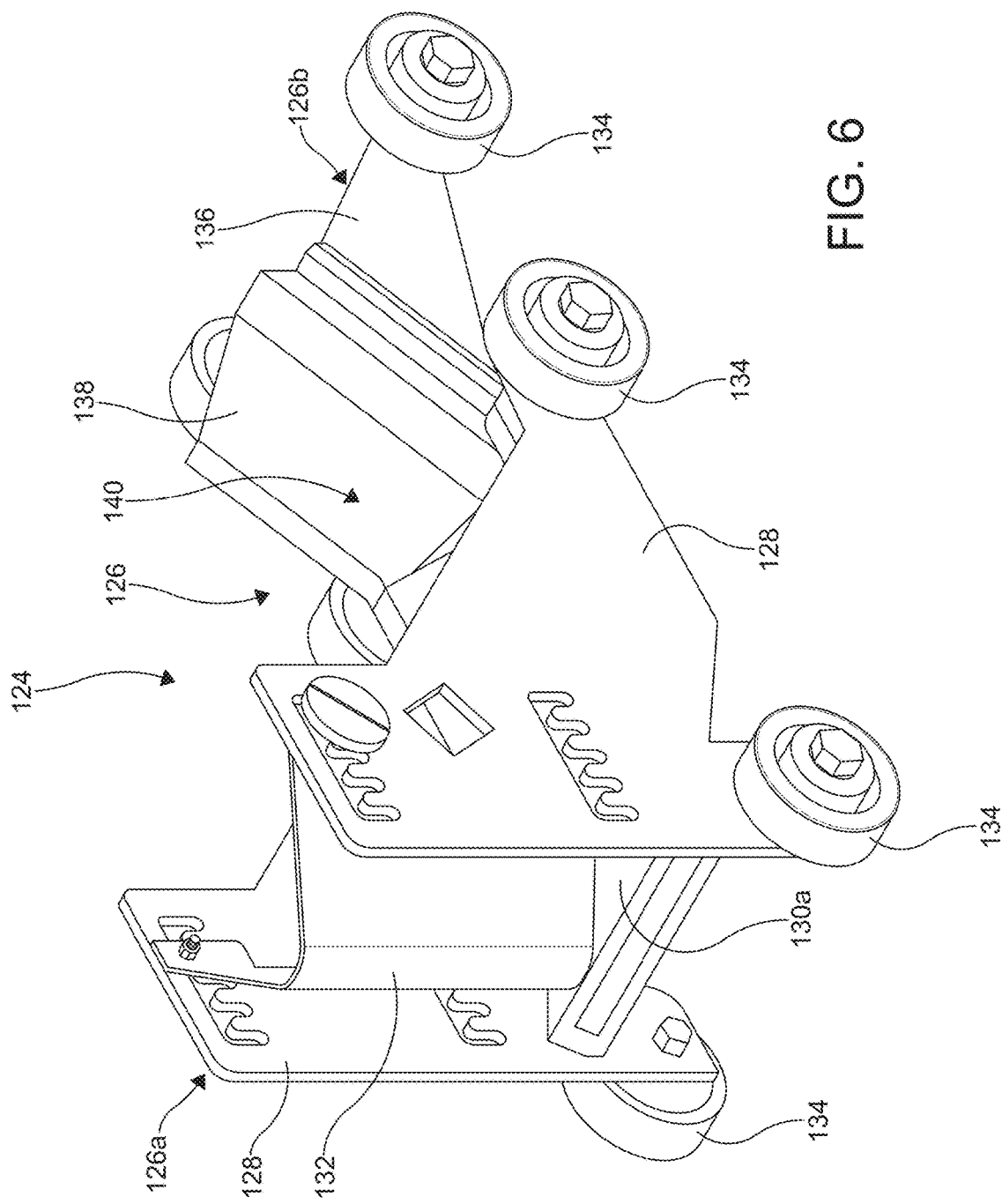

DYNAMOMETER HAVING A CHASSIS TO CHASSIS LOAD MEASUREMENT DEVICE

BACKGROUND OF THE INVENTION

This invention relates in general to machines used to measure torque and power, such as dynamometers, and in particular to dynamometers having a chassis to chassis load measurement device.

Dynamometers have been used for many years in the vehicle manufacturing industry for testing vehicles in place in addition to, or in lieu of, on-road testing. Known vehicle dynamometers may be used in a variety of testing operations. In one known application, a dynamometer is used to measure the torque and horsepower output of a vehicle. In another known application, a dynamometer is used to simulate the road load forces and the inertia forces that act on a vehicle during vehicle operation on a roadway. In both applications, users require that the dynamometer be capable of measuring roll torque with a high degree of accuracy.

One known chassis roll dynamometer comprises at least one dynamometer roller that is rotatably mounted in a stationary frame. The roller is configured to support at least one driven wheel of a vehicle to be tested. In some embodiments the roller may have a large diameter and may be several times larger than the diameter of the supported vehicle wheel. In other embodiments, the roller may have a diameter smaller than the diameter of the supported vehicle wheel. There is a driving engagement between the vehicle wheel and the roller due to the traction forces of the wheel, such that the vehicle wheel may drive the roller. Additionally, in some types of dynamometers the roller may drive the vehicle wheel.

Known dynamometers also include a device for developing a braking torque between the roller and dynamometer frame. Many types of devices for developing the braking torque are known and include frictional and hydraulic devices. Additionally, electromagnetic devices, such as a motor/generator brake and an eddy current brake are known. Known dynamometers also include an apparatus for simulating road load forces acting on the vehicle wheel, and/or for simulating inertial forces acting on the vehicle during acceleration and deceleration. Such road load forces include rolling friction and windage. The apparatus for simulating road load forces may comprise a motor coupled with the roller through a roller shaft and a controller for controlling energization of the motor in accordance with the simulation or test being conducted. In some known dynamometers, a flywheel is coupled with the roller shaft for simulating inertia. The motor in known dynamometers is often referred to as a power exchange unit because it may be operated to either apply power to the vehicle wheel, or to absorb power from the vehicle wheel through the roller. Additionally, the motor may operated as a torque generating device, or as a torque absorbing device and may be either a DC motor or an AC motor.

In known dynamometers, such as those described above, it is common practice to provide instrumentation for the measurement of the torque output and rotational speed of the vehicle wheel. The torque output is typically measured by a torque transducer connected in the drive train of the dynamometer with the transducer providing a roll torque signal to an electronic dynamometer controller. Wheel speed, which is generally the same as roller speed, is typically measured by a shaft encoder suitably connected to the dynamometer, and which supplies a rotational wheel speed signal to the dynamometer controller. The dynamometer controller typically includes a computer and monitors the dynamometer torque output and rotational wheel speed while controlling the applied load torque.

Known methods of measuring force generated by a vehicle using a conventional chassis roll dynamometer include: (1) calculating force by measuring the time it takes to rotationally accelerate a drum having a known mass. (2) physically measuring torque from the dynamometer shaft though a torque arm attached to either an electric, a mechanical, or a hydraulic brake, and (3) combining the data from methods 1 and 2 to provide an average or median of the data generated by the two methods. These common methods of measuring force with a conventional chassis roll dynamometer have the disadvantage that they cannot accurately account for all of the drag losses in the conventional chassis roll dynamometer system. Thus, it would be desirable to provide an improved dynamometer that minimizes such drag losses, and thereby improves the accuracy of a force measurement.

SUMMARY OF THE INVENTION

This invention relates to an improved structure for a dynamometer having a chassis to chassis load measurement device. In one embodiment, a dynamometer includes a dynamometer chassis configured to support a vehicle thereon. A roller load test unit is mounted in a load supporting surface of the dynamometer chassis, and a chassis to chassis load measurement device is attached between the dynamometer chassis and a chassis of the vehicle positioned on the dynamometer chassis. A load sensing mechanism is attached within the chassis to chassis load measurement device between the dynamometer chassis and the chassis of the vehicle supported on the dynamometer chassis such that a longitudinal axis of the vehicle extends therethrough, and the load sensing mechanism is configured to measure force in the longitudinal direction of the vehicle.

In another embodiment, a dynamometer includes a dynamometer chassis configured to support a vehicle thereon. A roller load test unit is mounted in a load supporting surface of the dynamometer chassis. A wheel carriage has a frame defining a wheel cavity therein and is supported by a plurality of wheels, wherein a wheel of the vehicle supported on the dynamometer chassis is releasably attached within the wheel cavity. A load sensing mechanism is attached between the dynamometer chassis and the wheel carriage such that a longitudinal axis of the vehicle extends through the load sensing mechanism, and the load sensing mechanism is configured to measure force in the longitudinal direction of the vehicle.

In an additional embodiment, a chassis to chassis load measurement device is configured for use on a dynamometer and includes a frame configured for attachment to a chassis of a dynamometer configured to support a vehicle thereon. An attachment bracket is attached between the frame and a chassis of the vehicle positioned on the dynamometer chassis. A load sensing mechanism is attached between the frame and the attachment bracket such that a longitudinal axis of the vehicle extends therethrough, and the load sensing mechanism is configured to measure force in the longitudinal direction of the vehicle.

Various aspects of this invention will become apparent to those skilled in the art from the following detailed description of the preferred embodiments, when read in light of the accompanying drawings.

BRIEF DESCRIPTION OF THE DRAWINGS

FIG. 6 is an enlarged perspective view of the wheel carriage illustrated in FIGS. 4 and 5.

DETAILED DESCRIPTION OF THE PREFERRED EMBODIMENTS

Figure 1:
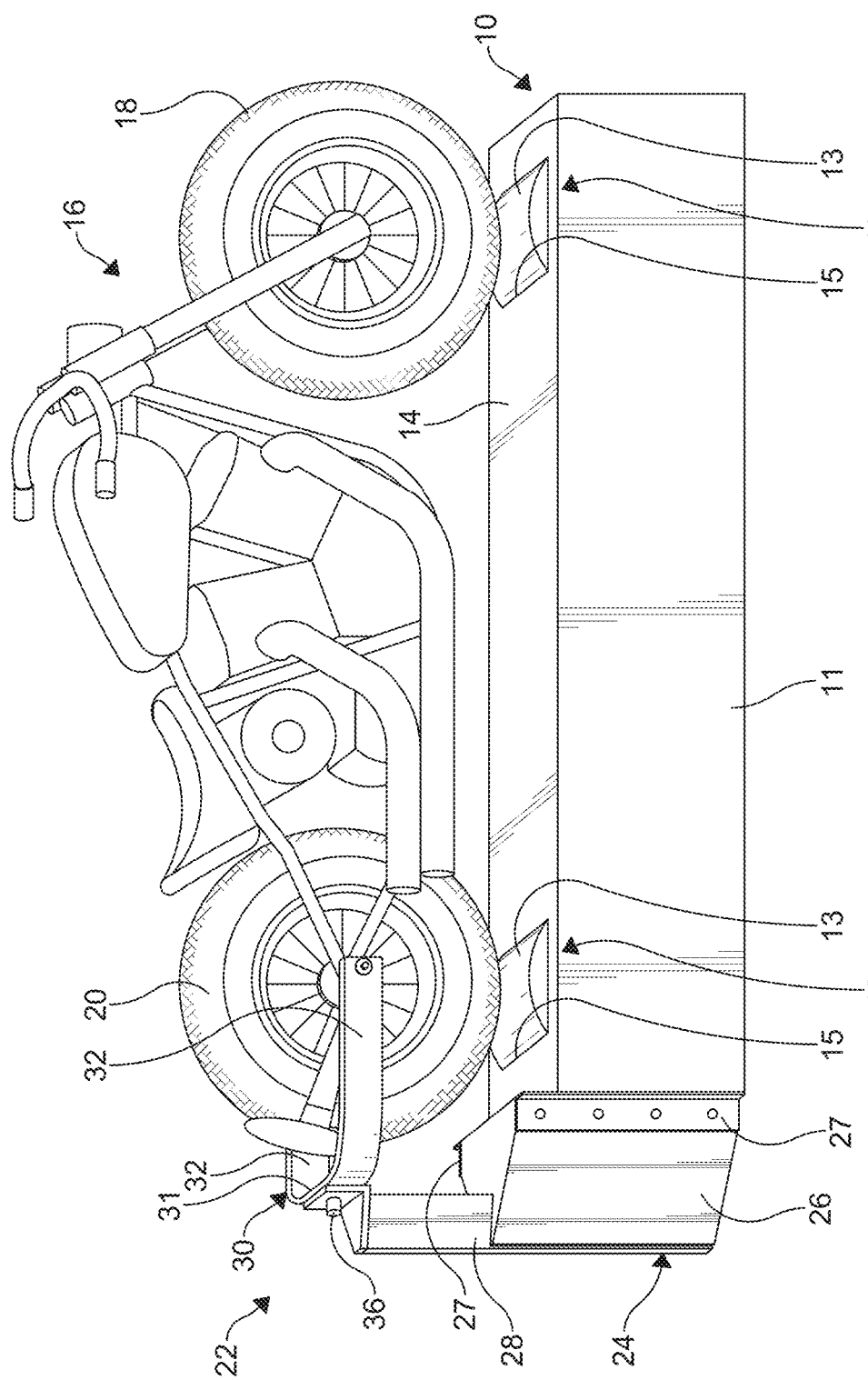
FIG. 1 is a perspective view of a first embodiment of a chassis dynamometer configured to test a vehicle in accordance with this invention.
Figure 2:
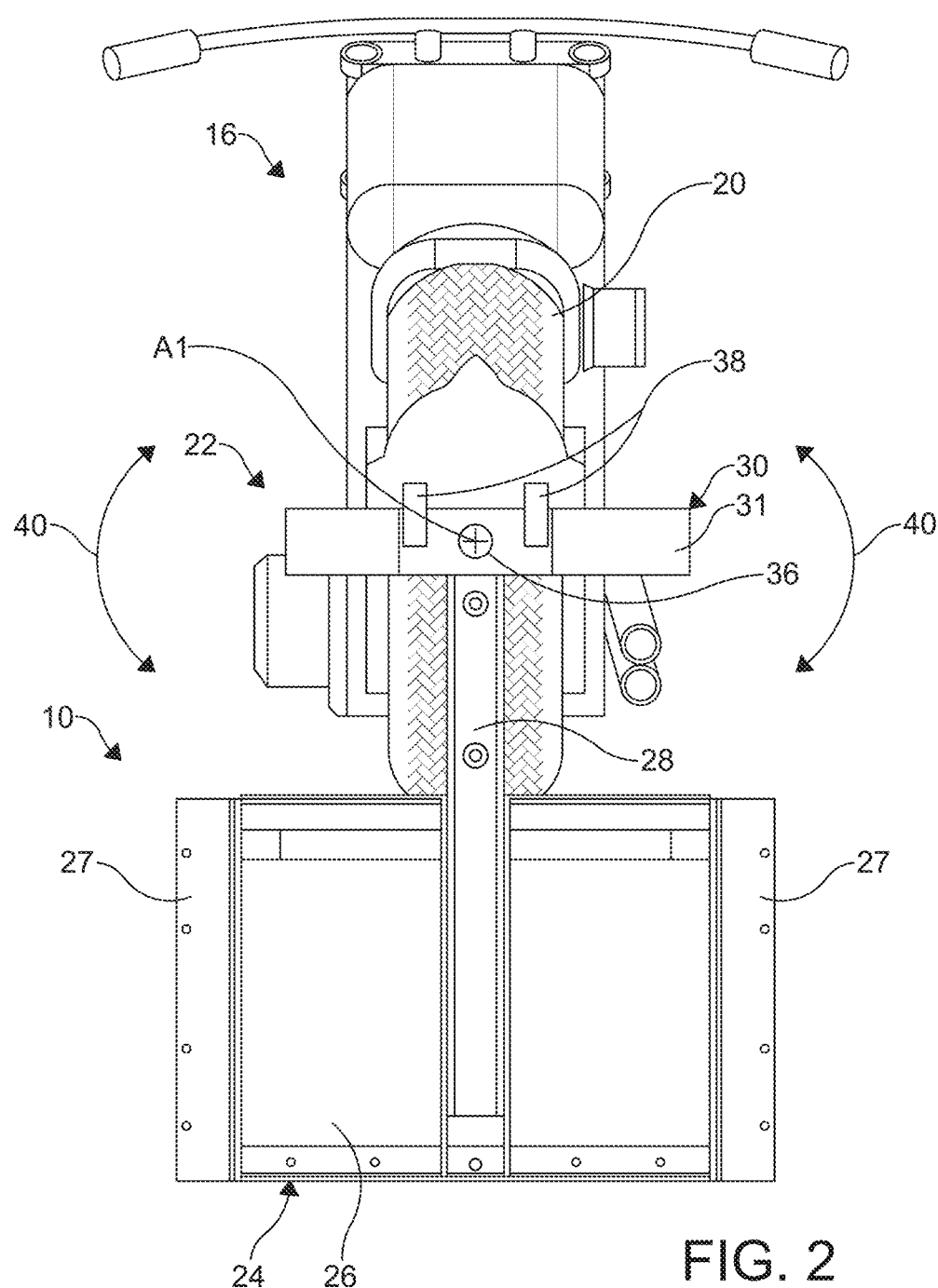
FIG. 2 is an end elevational view of the of the chassis dynamometer illustrated in FIG. 1.
Figure 3:
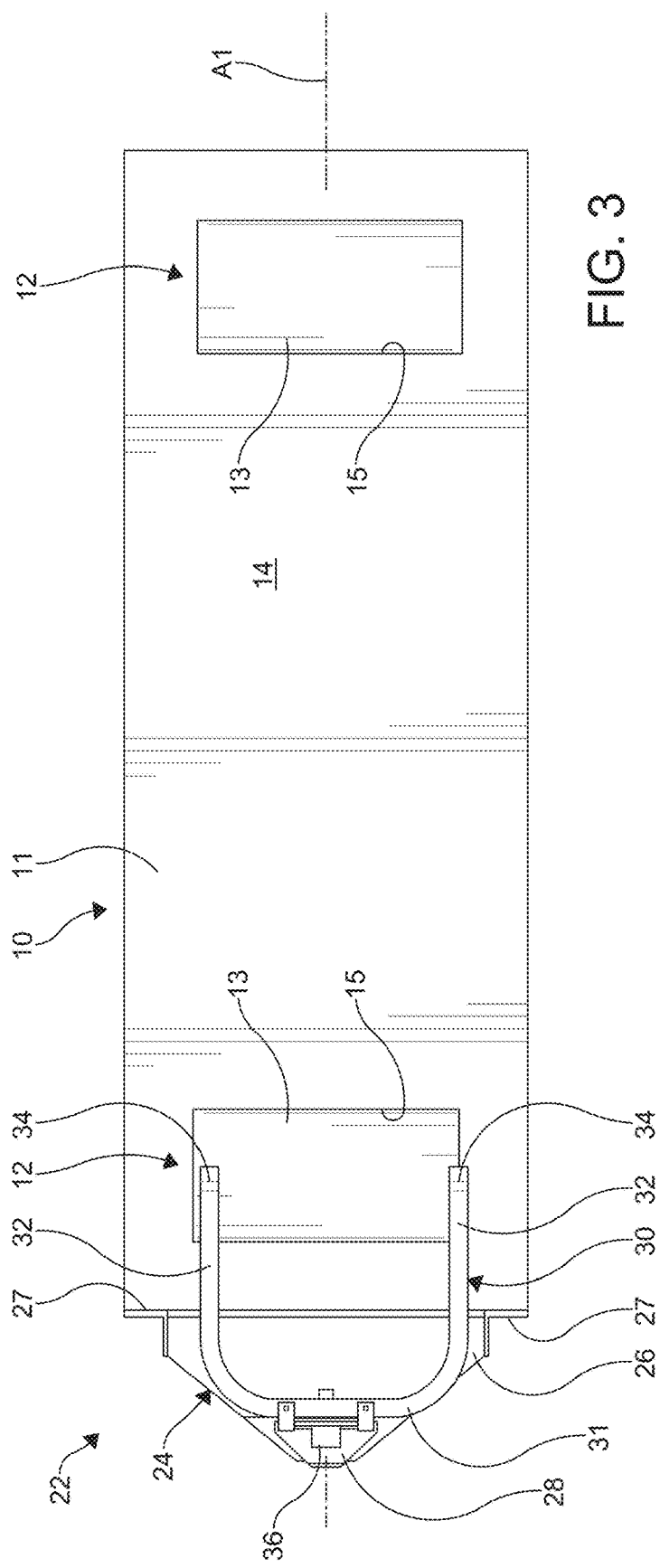
FIG. 3 is a top plan view of the chassis dynamometer illustrated in FIGS. 1 and 2 shown with the motorcycle removed.

Referring now to the drawings, there is illustrated in FIGS. 1 through 3 a basic structure of a chassis dynamometer 10 constructed in accordance with a first embodiment of the invention. The chassis dynamometer 10 may be a conventional chassis dynamometer, such as the dynamometer disclosed in U.S. Pat. No. 8,418,541, the disclosure of which is incorporated herein by reference.

The illustrated chassis dynamometer 10 includes a frame or chassis 11 with at least one roller load test unit 12 mounted in a load supporting surface 14 thereof. Each roller load test unit 12 includes a drum 13. As shown in FIG. 1, the chassis dynamometer 10 includes two roller load test units 12. Each roller load test unit 12 is mounted in a pit or chamber (not shown) below the load supporting surface 14 and within the chassis 11. Preferably, the surface 14 has openings 15 formed therein through which the drums 13 of the the roller load test units 12 project. Alternatively, the roller load test units 12 may be positioned such that no portions thereof extend outwardly (upwardly when viewing FIG. 1) of the load supporting surface 14. The chassis 11 and the drums 13 may be formed from any substantially rigid material such as steel. Alternatively, the chassis 11 and the drums 13 may be formed from other metals, metal alloys, and non-metal material, such as polymers and composite materials.

The illustrated motorcycle 16 is a conventional motorcycle and has two ground engaging wheels comprising one steerable front wheel 18 and one rear wheel 20. In the illustrated embodiment, the rear wheel 20 is the driven wheel.

Alternatively, the chassis dynamometer 10 may be configured to support a vehicle (not shown) having more than two ground engaging wheels, such as four ground engaging wheels. For a typical four-wheel vehicle, regardless of whether it is equipped with a two or four-wheel drive transmission, it is preferred that one roller load test unit 12 be provided for each wheel. While two roller load test units 12 are shown in FIG. 1, it will be appreciated that the invention may also be practiced with any desired number of roller load test units 12. The number of roller load test units 12 may, for example, be selected to correspond to the configuration of the vehicle being tested, and the number of driven wheels in the vehicle being tested. Thus, to test a vehicle having only one driven wheel, such as the illustrated motorcycle 16, only one roller load test unit 12 is required, although two roller load test units 12 may be provided as shown.

The chassis dynamometer 10 includes a first embodiment of a chassis to chassis load measurement device 22. The chassis to chassis load measurement device 22 includes a substantially rigid frame 24, a substantially rigid attachment bracket 30, and a load sensing mechanism, such as a load cell 36. The frame 24 includes a base 26 and an outwardly extending (upwardly extending when viewing FIG. 1) mounting post 28. The base 26 and the mounting post 28 may be formed from any substantially rigid material such as steel. Alternatively, the base 26 and the mounting post 28 may be formed from other metals, metal alloys, and non-metal material, such as polymers and composite materials.

The attachment bracket 30 is attached to the mounting post 28 and is configured to be attached to the chassis or frame of the motorcycle 16 so as to support the motorcycle 16 on the chassis dynamometer 10. The attachment bracket 30 may be pivotally attached to the mounting post 28 by any desired method such as by a spindle (not shown) that extends through a tapered roller bearing (not shown). In this embodiment, the attachment bracket 30 may rotate about the spindle (not shown). Alternatively, the attachment bracket 30 may be attached to the mounting post 28 by a bolt (not shown) that extends through a bushing (not shown), thereby allowing the attachment bracket 30 to rotate about the bolt (not shown).

The illustrated attachment bracket 30 is substantially U-shaped and includes a base portion 31 and two substantially parallel legs 32 extending from the base portion 31. Each leg 32 has a vehicle mounting aperture 34 formed therein at a distal end thereof. Alternatively, the attachment bracket 30 may have any other desired shape. The vehicle mounting apertures 34 are configured to be attached to an axle (not shown) of the rear wheel 20 of the motorcycle 16. Alternatively, the attachment bracket 30 may be attached to any other desired portion of the motorcycle frame.

The attachment bracket 30 may be formed from any substantially rigid material such as steel. Alternatively, the attachment bracket 30 may be formed from other metals, metal alloys, and non-metal material, such as polymers and composite materials.

The load cell 36 is positioned between, and attached to both the mounting post 28 of the frame 24 and the attachment bracket 30. The load cell 36 may be any type of load cell, such as a washer type load cell, and is positioned such that a longitudinal axis A1 of the motorcycle 16 runs therethrough. The load cell 36 may also be any other type of load cell, load sensor, or other device that measures force in the longitudinal direction, i.e., along the axis A1, of the motorcycle 16.

The load cell 36 may be mounted, for example, between a retaining nut (not shown) of the spindle (not shown) and the structures to which the spindle (not shown) is mounted, such as the mounting post 28 and the attachment bracket 30. Alternatively, in an embodiment wherein the attachment bracket 30 is attached to the mounting post 28 by a bolt (not shown), the load cell 36 may be mounted between a head of the bolt (not shown) and the structure to which the bolt (not shown) is mounted, such as the mounting post 28 and the attachment bracket 30.

Additionally, one or more strain gauges (not shown) may be mounted to the base portion 31 of the attachment bracket 30. In such an embodiment, the strain gauge or gauges (not shown) may be configured to measure strain on the base portion 31. It will be understood that a load exerted by the motorcycle 16 may be calculated from measurement data measured by the strain gauge (not shown).

The base 26 of the frame 24 may be attached to the chassis 11 of the chassis dynamometer 10 by any desired method such as by welding or with mechanical fasteners. In the embodiment illustrated in FIGS. 1 through 3, the base 26 is attached to the chassis 11 with elongated brackets 27. Alternatively, the base 26 may be attached to a floor (not shown) or a wall (not shown) of a building (not shown) in which the chassis dynamometer 10 and the chassis to chassis load measurement device 22 are housed. If the base 26 is attached to a structure other than the chassis 11 of the chassis dynamometer 10, the chassis 11 is also preferably attached to the same structure such that the chassis to chassis load measurement device 22 is fixed relative to the chassis dynamometer 10.

The chassis to chassis load measurement device 22 thus secures the motorcycle 16 in an upright position relative to the chassis dynamometer 10, and ensures that the vehicle wheels 18 and 20 are positioned on the load test units 12 without the need of additional restraint mechanisms, such as straps. The chassis to chassis load measurement device 22 therefore effectively isolates the sensed and measured force longitudinally (in a fore and aft direction) along a length of the motorcycle 16 (see the axis A1).

Because the load cell 36 is mounted between the frame 24 and the attachment bracket 30, the load cell 36 thus measures longitudinal force between the frame 24 and the attachment bracket 30, and not within the chassis 11 of the chassis dynamometer 10. Advantageously, force measurement errors that may occur within the chassis dynamometer 10 due to drag, such as caused by bearing resistance, rolling resistance, and/or air resistance may be mitigated.

The force measured by the load cell 36 mounted between the frame 24 and the attachment bracket 30 may be combined with a speed of the motorcycle 16, such as conventionally calculated by measuring the rotational speed of at least one of the drums 13, such as the drum 13 positioned beneath the rear wheel 20, and may be used to accurately calculate horsepower and torque where the rear wheel 20 meets the drum 13. Additionally, vehicle engine revolutions per minute (rpm) may also be measured and used to calculate engine torque.

It will be appreciated that the longitudinal force measured by the load cell 36 of the chassis to chassis load measurement device 22 may replace similar force measurements made by a conventional chassis dynamometer, such as the chassis dynamometer 10. Alternatively, the longitudinal force measured by the load cell 36 may be used in addition to force measurements made by the chassis dynamometer 10.

If desired, one or more vehicle roll detection sensors 38, shown in FIGS. 2 and 3, may be added to the chassis to chassis load measurement device 22. For example, roll detection sensors 38 may be mounted at one or more locations on the attachment bracket 30. As shown in FIG. 2, two roll detection sensors 38 are mounted to the attachment bracket 30 on opposite sides of the longitudinal axis A1 of the motorcycle 16. Roll, or movement about the axis A1, as indicated by the arrows 40 in FIG. 2, may be detected by the roll detection sensors 38. Roll data sensed and collected by the roll detection sensors 38 may then be used to provide simulated turning data to a riding or driving simulation software in a dynamometer controller (not shown).

Figure 4:
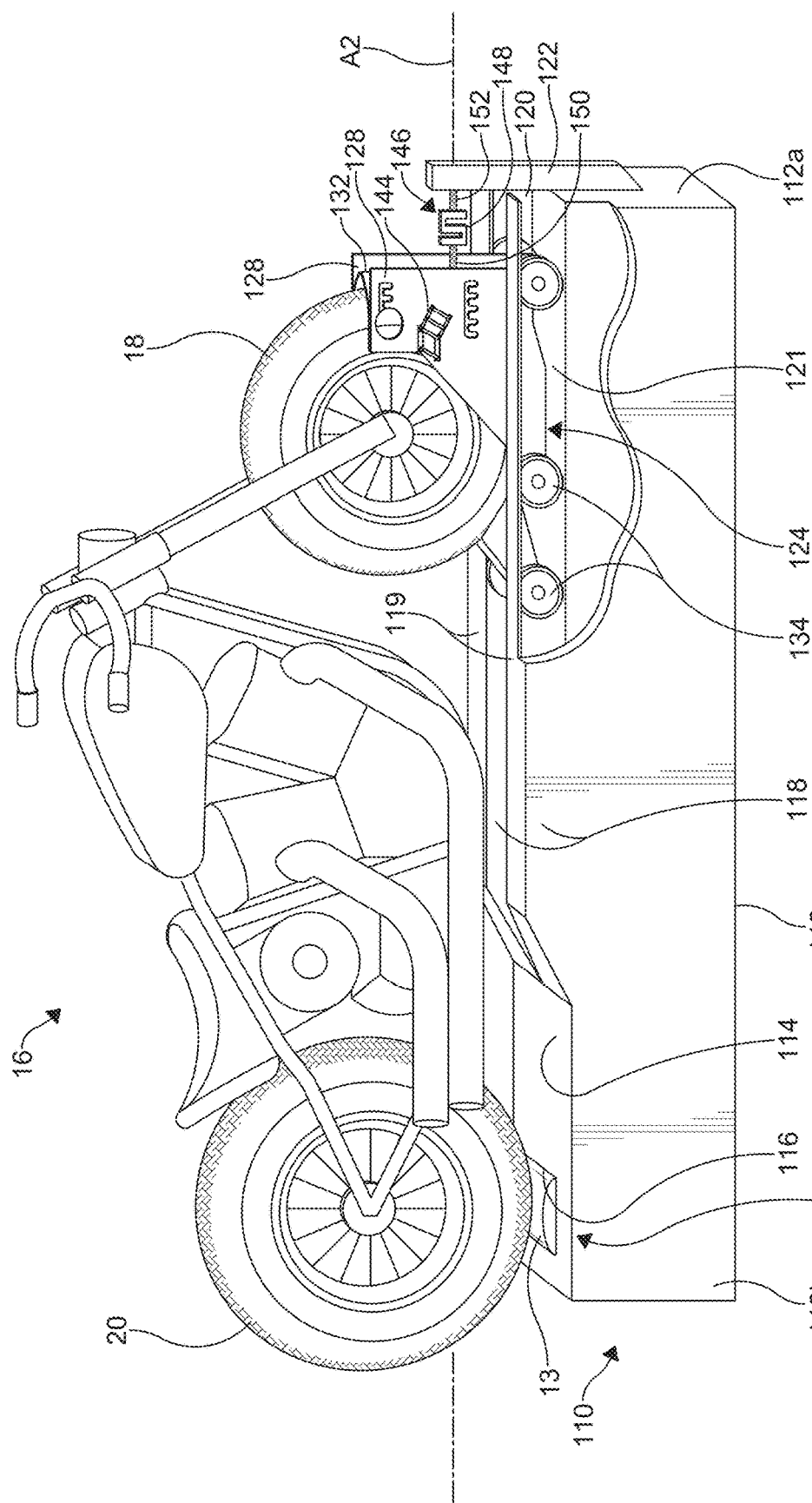
FIG. 4 is a perspective view of a second embodiment of the chassis dynamometer in accordance with this invention.
Figure 5:
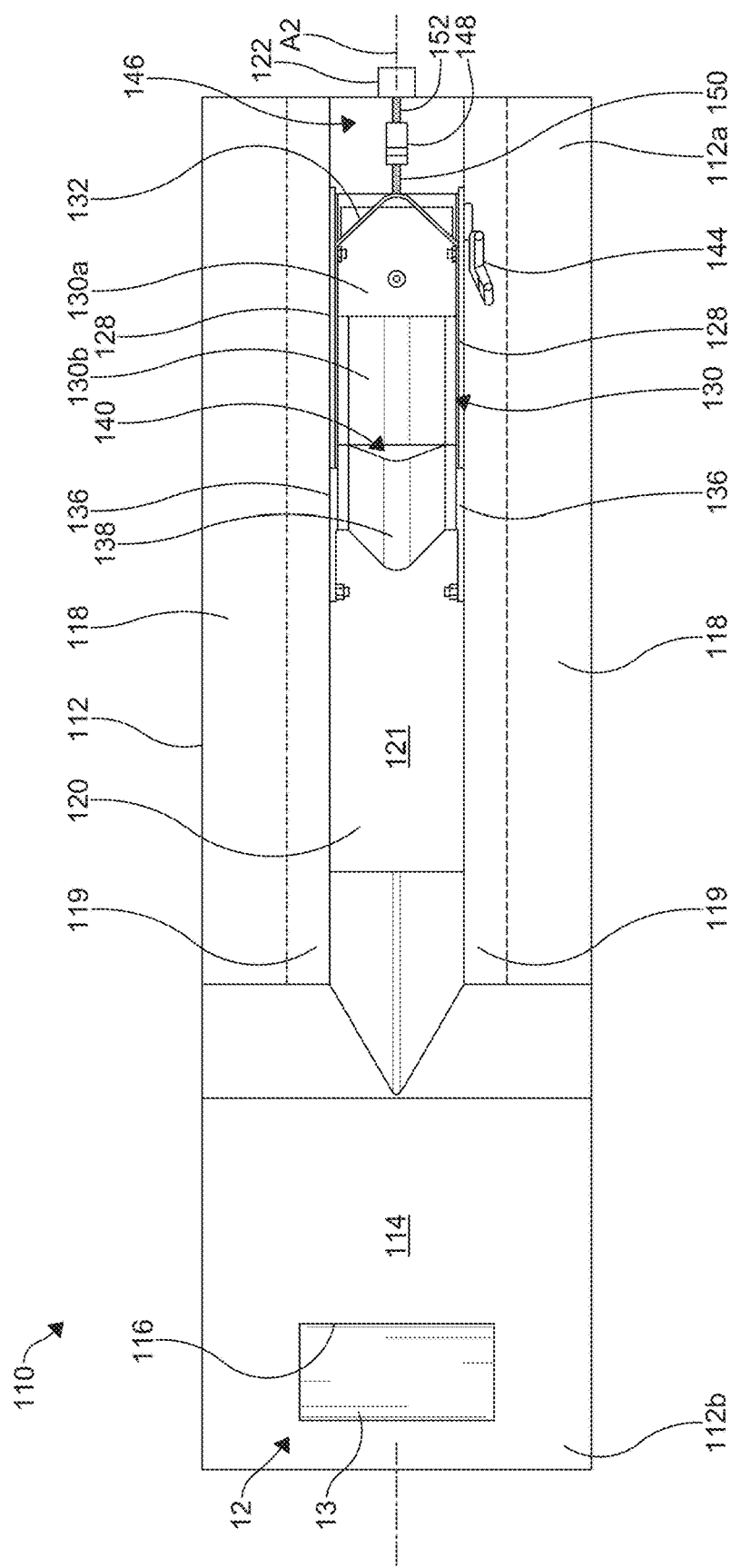
FIG. 5 is a top plan view of the chassis dynamometer illustrated in FIG. 4 shown with the motorcycle removed.

Referring now to FIGS. 4 through 6, a second embodiment of a chassis dynamometer is illustrated generally at 110. The chassis dynamometer 110 is similar to the chassis dynamometer 10, and includes a chassis 112 having a first end 112a (right end when viewing FIGS. 4 and 5), a second end 112b (left end when viewing FIGS. 4 and 5), and a load supporting surface 114. The load supporting surface 114 includes at least one drum opening 116 formed therein. Like the chassis dynamometer 10, the chassis dynamometer 110 includes a roller load test unit 12 mounted within the drum opening 116 in a pit or chamber (not shown) below the load supporting surface 114 of the chassis 112, such that the drum 13 extends outwardly (upwardly when viewing FIG. 4) from the load supporting surface 114, such that the motorcycle 16 may be mounted and driven thereon.

Alternatively, the roller load test units 12 may be positioned such that no portion of the drum 13 extends outwardly (upwardly when viewing FIG. 4) of the load supporting surface 114. The chassis 112 may be formed from any substantially rigid material such as steel. Alternatively, the chassis 112 may be formed from other metals, metal alloys, and non-metal material, such as polymers and composite materials.

Carriage retention walls 118 extend outwardly (upwardly when viewing FIG. 4) from the load supporting surface 114 on opposite sides of the chassis 112 and define an elongated carriage channel 120 therebetween. Each carriage retention wall 118 includes an inwardly extending wheel retention portion 119 configured to retain wheels 134 of a wheel stop or wheel carriage 124 within the carriage channel 120.

In the illustrated embodiment, the carriage retention walls 118 extend from the second end 112b to a point intermediate the first end 112a and the second end 112b. A substantially rigid load cell mounting arm 122 is mounted to the first end 112a of the chassis 112 and extends outwardly therefrom (upwardly when viewing FIG. 4). The mounting arm 122 may be attached to the chassis 112 of the chassis dynamometer 110 by any desired method such as by welding or with mechanical fasteners. The mounting arm 122 may be formed from any substantially rigid material such as steel. Alternatively, the attachment mounting arm 122 may be formed from other metals, metal alloys, and non-metal material, such as polymers and composite materials. The chassis 112 may be attached to a floor or a wall of a building or other structure (not shown) in which the chassis dynamometer 110 may be housed.

As described above, the motorcycle 16 is a conventional motorcycle and has two ground engaging wheels comprising one steerable front wheel 18 and one rear wheel 20. In the illustrated embodiment, the rear wheel 20 is the driven wheel. Alternatively, the chassis dynamometer 110 may be configured to support a vehicle (not shown) having more than two ground engaging wheels, such as four ground engaging wheels.

A second embodiment of the chassis to chassis load measurement device is configured as the wheel carriage 124, as best shown in FIGS. 4 and 6. The wheel carriage 124 includes a carriage frame 126 having a first frame portion 126a and a second frame portion 126b. The first frame portion 126a includes two side walls 128, a bottom wall 130, and a substantially V-shaped front wall 132. A first portion 130a of the bottom wall 130 is attached between the side walls 128 at an acute angle relative to a surface 121 of the carriage channel 120. A second portion 130b of the bottom wall 130 extends rearwardly from the first portion 130a (to the left when viewing FIG. 5) and is substantially parallel to the surface 121 of the carriage channel 120. Two or more pairs of the wheels 134 are attached to the first frame portion 126a and are configured to engage and roll on the surface 121 of the carriage channel 120.

The second frame portion 126b includes two side walls 136 and a bottom wall 138 attached to the first frame portion 126a. The bottom wall 138 is attached between the side walls 136 at an acute angle relative to the surface 121 of the carriage channel 120. At least one pair of the wheels 134 are attached to the second frame portion 126b and are configured to engage and roll on the surface 121 of the carriage channel 120. The first and second portions 130a and 130b of the bottom wall 130, the bottom wall 138, the side walls 128, and the front wall 132 cooperate to define a wheel cavity 140. Brackets 144 configured for the attachment of fastening means, such as one or more conventional ratchet-type wheel tie down straps (not shown), may be attached to one or both of the side walls 128. The brackets 144, and the tie down straps (not shown) attached thereto, may be configured to securely attach the front wheel 18 within the wheel cavity of the wheel carriage 124.

The wheel carriage 124 has been described as including one or more pairs of the wheels 134 so as to be longitudinally movable within the within the carriage channel 120. Alternatively, and in lieu of the pairs of wheels 134, the wheel carriage 124 may be provided with other devices to facilitate longitudinal movement within the within the carriage channel 120, such as rollers, bearings, skis, and the like.

The chassis dynamometer 110 also includes a load cell assembly 146. The load cell assembly 146 extends between, and rigidly connects, the wheel carriage 124 and the load cell mounting arm 122. The load cell assembly 146 includes a load sensing mechanism, such as a load cell 148, connected to the wheel carriage 124 by a first rod 150 and connected to the load cell mounting arm 122 by a second rod 152.

In one embodiment, the rods 150 and 152 are threaded rods, or portions of a single threaded rod, and the load cell 148 is attached by a threaded connection. For example the rod 150 may be threaded to both the carriage frame 126 and the load cell 148, and the rod 152 may be threaded to both the mounting arm 122 and the load cell 148. Jam nuts (not shown), or other locking nuts, may be used to secure the rod 150 to one or both of the carriage frame 126 and the load cell 148. Similarly, jam nuts (not shown), or other locking nuts, may be used to secure the rod 152 to one or both of the mounting arm 122 and the load cell 148.

Alternatively, any method of attaching the load cell 148 to and between the carriage frame 126 and the mounting arm 122 that effectively isolates the sensed force longitudinally, i.e., along the axis A2, may be used. Additionally, the wheels 134 on wheel carriage 124 ensure that any movement of the wheel carriage 124 is also longitudinal within the carriage channel 120.

The load cell 148 may be any desired load cell, load sensing mechanism, or any device that measures force between the frame of the motorcycle 16 and the chassis 112 of the chassis dynamometer 110 in the longitudinal direction, i.e., along the axis A2, of the motorcycle 16.

In another embodiment (not shown), the wheel carriage 124 may be fixedly mounted to the mounting arm 122 by any desired means, such as by welding, with a strut (not shown), or with mechanical fasteners (not shown). One or more strain gauges (not shown) may be mounted to the mounting arm 122. In such an embodiment, the strain gauge or gauges (not shown) may be configured to measure strain on the mounting arm 122. It will be understood that a load exerted by the motorcycle 16 may be calculated from the strain gauge measurement.

As described above, the mounting arm 122 may be attached to the chassis 112 of the chassis dynamometer 110 by any desired method such as by welding or with mechanical fasteners. Alternatively, the mounting arm 122 may be attached to a floor (not shown) or a wall (not shown) of a building (not shown) in which the chassis dynamometer 110 and the wheel carriage 124 are housed. If the mounting arm 122 is attached to a structure other than the chassis 112 of the chassis dynamometer 110, the chassis 112 is also preferably attached to the same structure such that the mounting arm 122 and the wheel carriage 124 attached thereto are fixed relative to the chassis dynamometer 110.

In operation, the front wheel 18 may be securely attached within the wheel cavity 142 of the wheel carriage 124 with the tie down straps (not shown) attached to the brackets 144, the rear wheel 20 may be positioned over the drum 13, and the motorcycle 16 may be operated at a desired speed or range of speeds.

The wheel carriage 124 thus secures the motorcycle 16 in an upright position relative to the chassis dynamometer 110. Additionally, the wheel carriage 124 may be positioned within the carriage channel 120 to ensure that the rear wheel 20 of the motorcycle 16 is positioned on the load test unit 12 without the need of additional restraint structures or straps on the motorcycle 16.

In the embodiment shown in FIG. 4, the load cell assembly 146 effectively isolates the sensed force longitudinally, i.e., along the axis A2. Additionally, the wheels 134 on wheel carriage 124 ensure that any movement of the wheel carriage 124 is also longitudinal within the carriage channel 120.

Because the load cell 148 is mounted between the chassis 112, via the load cell mounting arm 122, and the wheel carriage 124, the load cell 148 thus measures longitudinal force between the wheel carriage 124 and the chassis 112, and not within the chassis 112 of the chassis dynamometer 110. Advantageously, force measurement errors that may occur within the chassis dynamometer 110 due to drag, such as caused by bearing resistance, rolling resistance, and/or air resistance, may be mitigated.

The force measured by the load cell 148 mounted between the load cell mounting arm 122 and the carriage frame 126 may be combined with a speed of the motorcycle 16, such as conventionally calculated by measuring the rotational speed of the drum 13, and may be used to accurately calculate horsepower and torque where the rear wheel 20 meets the drum 13. Additionally, vehicle engine rpm may also be measured and used to calculate engine torque.

It will be appreciated that the longitudinal force measured by the load cell 148 may replace similar force measurements made by a conventional chassis dynamometer, such as the chassis dynamometer 10. Alternatively, the longitudinal force measured by the load cell 148 may be used in addition to other, known force measurements made by the chassis dynamometer 110.

Alternatively, the improved chassis to chassis load measurement device disclosed herein may be any suitable structure configured to be connected between the dynamometer chassis 11 and 112, and also having a load cell, such as the load cells 36 and 142, respectively, mounted thereto and configured to measure force in the longitudinal direction of a vehicle, such as the motorcycle 16. For example, such alternative embodiments of the chassis to chassis load measurement device may be attached to any portion of the dynamometer chassis 11 and 112 and to any portion of the chassis of a vehicle mounted on the dynamometer chassis 11 and 112. The portion of the vehicle chassis may include, but is not limited to, a frame, a body, a wheel axle, a bumper, a trailer hitch, and any other desired portion of the chassis of a vehicle, including vehicles having two, three, four, or more wheels.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A dynamometer comprising:
   a dynamometer chassis configured to support a vehicle thereon;
   a roller load test unit mounted in a load supporting surface of the dynamometer chassis;
   a wheel carriage having a frame defining a wheel cavity therein and supported by a plurality of wheels, wherein a wheel of the vehicle supported on the dynamometer chassis is releasably attached within the wheel cavity, and wherein the wheel carriage is longitudinally movable upon the plurality of wheels along the dynamometer chassis during operation of the vehicle on the dynamometer; and
   a load sensing mechanism attached between the dynamometer chassis and the wheel carriage such that a longitudinal axis of the vehicle extends through the load sensing mechanism, the load sensing mechanism configured to measure force in the longitudinal direction of the vehicle between the wheel carriage and the dynamometer chassis during operation of the vehicle on the dynamometer.

2. The dynamometer according to claim 1, further including a load cell mounting arm attached to the dynamometer chassis and extending outward therefrom.

3. The dynamometer according to claim 1, wherein the load sensing mechanism is a load cell.

4. The dynamometer according to claim 3, further including a first rod connecting the load cell to the wheel carriage, and a second rod connecting the load cell to the dynamometer chassis.

5. The dynamometer according to claim 3, further including a load cell mounting arm attached to the dynamometer chassis and extending outward therefrom, wherein the second rod connects the load cell to the load cell mounting arm.

6. The dynamometer according to claim 4, wherein the dynamometer chassis defines a load supporting surface upon which the vehicle is supported, and wherein the dynamometer chassis further includes carriage retention walls extending outwardly from the load supporting surface and defining an elongated carriage channel therebetween.

* * * * *